United States Patent
Fukushima

(10) Patent No.: US 6,836,453 B2
(45) Date of Patent: Dec. 28, 2004

(54) RE-READ OF DATA READ PRIOR TO READ INHIBIT FOR DATA RECOVERY AND VALIDATION IN A SAMPLED POSITION DATA STORAGE DEVICE

(75) Inventor: Craig N. Fukushima, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 10/050,318

(22) Filed: Jan. 16, 2002

(65) Prior Publication Data

US 2003/0133382 A1 Jul. 17, 2003

(51) Int. Cl.[7] .................................................. G11B 7/00
(52) U.S. Cl. ............................... 369/44.34; 369/44.32; 369/53.12; 369/53.28
(58) Field of Search ............................ 369/44.27, 44.28, 369/44.32, 44.34, 47.1, 47.14, 53.1, 53.11, 53.12, 53.13, 53.14, 53.15, 53.16, 53.17, 53.18, 53.19, 53.32, 59.1, 53.28

(56) References Cited

U.S. PATENT DOCUMENTS

| | | | |
|---|---|---|---|
| 4,516,165 A | | 5/1985 | Cunningham et al. |
| 5,153,788 A | * | 10/1992 | Nishikawa et al. ...... 360/77.08 |
| 5,189,566 A | | 2/1993 | Christensen et al. |
| 5,270,880 A | | 12/1993 | Ottesen et al. |
| 5,353,170 A | | 10/1994 | Fung et al. |
| 5,421,003 A | | 5/1995 | Escola et al. |
| 5,612,845 A | | 3/1997 | Smith |
| 5,765,189 A | | 6/1998 | Treiber et al. |
| 6,049,442 A | | 4/2000 | Fukushima et al. |
| 6,055,118 A | | 4/2000 | Du |
| 6,392,831 B1 | * | 5/2002 | Yeo et al. ...................... 360/53 |

FOREIGN PATENT DOCUMENTS

GB    2 273 185 A    6/1994

OTHER PUBLICATIONS

Thompson, G.H., "Error Detection and Correction Apparatus," IBM Technical Disclosure Bulletin, Jun. 1974, 17(1): 2 pp.

* cited by examiner

*Primary Examiner*—Muhammad Edun
(74) *Attorney, Agent, or Firm*—Gates & Cooper LLP

(57) ABSTRACT

A data storage device performs a re-read of data prior to a read inhibit for data recovery and validation. When misregistration of read/write heads occurs, as indicated by a sampled servo position, data read from a track of the data storage device is withheld from a host until a subsequent sampled servo position is verified to be within a read limit width of the track. Data blocks preceding the servo position that caused the posting of the read inhibit are re-read, once the read inhibit is cleared. If the read inhibit is not present following the re-read of the data, this re-read data can be released to the host.

21 Claims, 3 Drawing Sheets

RE-READ OF DATA READ PRIOR TO READ INHIBIT FOR DATA RECOVERY AND VALIDATION IN A SAMPLED POSITION DATA STORAGE DEVICE

BACKGROUND OF THE INVENTION

1. Field of the Invention

The present invention relates generally to servo control systems used for positioning read/write transducers in data storage devices, and more particularly, to providing a re-read of data read prior to a read inhibit for data recovery and validation in a sampled position data storage device.

2. Description of Related Art

It is well known in the art to store data on magnetic or optical disk drives. Data is stored on a disk drive on one or more tracks of predetermined format disposed on a disk-shaped recording media. The data is written to and read from the tracks using one or more transducers, which typically comprise read/write heads. Reading data from a desired one of the tracks on the disk surfaces requires knowledge of the read/write head position relative to the track as the disk rotates and the head is moved across the disk, and requires precise centering of the head over the disk track. Conventionally, the read/write head is mounted on a head positioning assembly that is moved by a servo control loop.

The servo control loop controls movement of the head positioning assembly across the disk surface to move the read/write head from track to track (track seeking) and, once over a selected track, to maintain the read/write head in a path over the centerline of the track (track following). Centering the read/write head over a track permits accurate reading and recording of data in the track.

In most devices, the servo control loop is a closed loop system that utilizes sampled position information, also known as servo information, obtained from the disk surface to provide feedback for the track seeking and track following functions. Some devices store this position information between the data regions of the disk surface (known as an embedded servo system).

The sampled position information usually includes: a synchronization field, such as for automatic gain control (AGC) or similar signal detecting purposes; a track identification (TID) field typically comprising a digitally encoded Grey code; and a position error signal (PES) field generally containing one or more burst patterns. The PES, which is proportional to the relative difference of the positions of the center of the read/write head and the nearest track centerline, is a corrective signal providing an indication of which direction the head should be moved to during either track seeking or track following functions.

As the track densities of disk drives increase, the accuracy of the PES becomes increasingly important. Unfortunately, as track pitch decreases, the tolerances arising in the manufacture of the read/write heads do not decrease proportionately, and this results in heads that either write or read more narrowly relative to track pitch. This narrow read or write characteristic results in more "soft" and "hard" errors resulting from misregistration of the read/write heads.

SUMMARY OF THE INVENTION

To minimize the limitations in the prior art described above, and to minimize other limitations that will become apparent upon reading and understanding the present specification, the present invention discloses a data storage device that performs a re-read of data read prior to a read inhibit for data recovery and validation. When misregistration of read/write heads occurs, as indicated by a sampled servo position, data read from a track of the data storage device is withheld from a host until a subsequent sampled servo position is verified to be within a read limit width of the track. Data blocks read preceding the servo position that caused the posting of the read inhibit are re-read, once the read inhibit is cleared. If the read inhibit is not present following the re-read of the data, this re-read data can be released to the host

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Disk Drive Components

Figure 1:
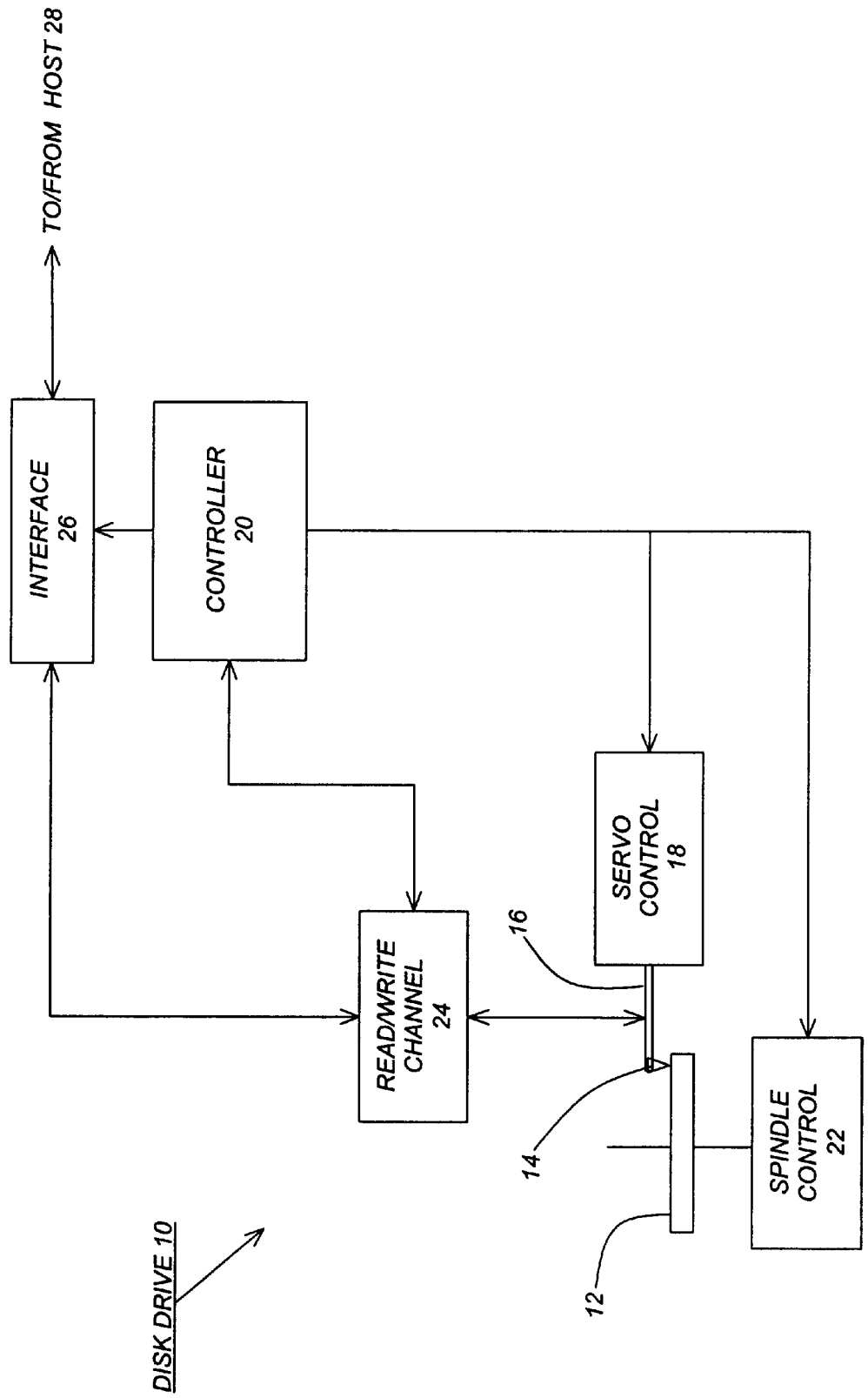
FIG. 1 illustrates the components of a data storage device according to the preferred embodiment of the present invention.

FIG. 1 is a block diagram of an exemplary disk drive 10 according to the preferred embodiment of the present invention. Those skilled in the art will recognize that the exemplary components and structure illustrated in FIG. 1 are not intended to limit the present invention. Indeed, those skilled in the art will recognize that other alternative embodiments may be used without departing from the scope of the present invention.

The disk drive 10 is comprised of one or more disks 12, which may be stacked and rotateably mounted on a spindle, wherein information is stored on the surfaces of the disks 12 in the form of transitions or patterns formed on one or more tracks thereon. Transitions are sensed or "read" from the surfaces of the disks 12 via one or more transducers 14, known as read/write heads, supported in close proximity to the surfaces of the disks 12 by a head positioning assembly 16, wherein the transducers 14 convert the transitions into electrical signals. The head positioning assembly 16 positions the transducers 14 over the surfaces of the disks 12 in a linear or rotary manner by operation of a servo control 18, which is controlled by a controller 20, while the rotation of the disks 12 is sped up or slowed down by a spindle control 22, which is also controlled by the controller 20.

Data is provided to and from the read/write heads 14 through a read/write channel 24 and interface 26 with a host computer 28. The read/write heads 14 write data to the surfaces of the disks 12, and then read the data from the surfaces of the disks 12, as well as provide servo information from the surfaces of the disks 12 to the controller 20.

The servo information, which comprises sampled position information, is provided to the controller 20, in the form of a position error signal (PES), to indicate the direction and extent of movement required to maintain the read/write heads 14 centered about a track on the disk 12. The controller 20 then uses the PES to generate the control signals to the servo control 18 to move the head positioning assembly 14 and read/write heads 12, and to the spindle control 22 to speed up or slow down the rotation of the disks 12.

In this manner, the controller 20 controls movement of the head positioning assembly 16 across the surface of the disks 12 to move the read/write heads 14 from track to track (track seeking) and, once over a selected track, to maintain the read/write heads 14 in a path over the centerline of the track (track following). Centering the read/write heads 14 over a track permits accurate reading and recording of data in the track.

Of course, writing and reading data to the tracks on the surface of the rotating disks 12 is subject to data errors arising from head 14 tracking errors. One method for reducing both hard (write) and soft (read) errors is to define a track centerline and establish limited off-track regions about each track centerline on the disk. Generally, these are known as a write off-track limit (WOL) and read off-track limit (ROL).

Operation of the Disk Drive

Figure 2:
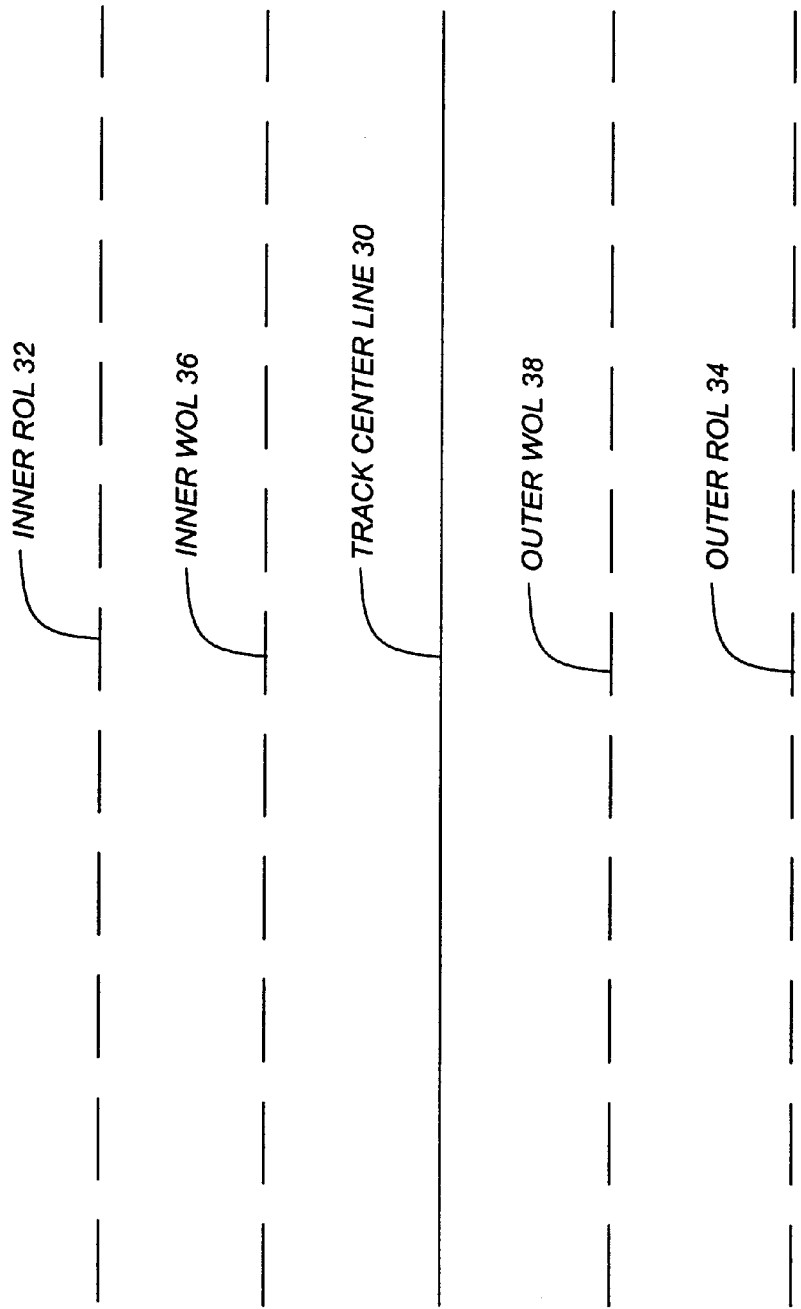
FIG. 2 illustrates the geometry of a track as used in the preferred embodiment of the present invention.

FIG. 2 illustrates the geometry of a track as used in the preferred embodiment of the present invention. The track is nominally located at track centerline 30 and has a finite width bounded by off-track limits for the read and write operations. The Read Off-track Limits (ROLs) are illustrated as the inner ROL 32 located toward the center of the disk 12 (not shown) and the outer ROL 34 located toward the edge of the disk 12 (not shown). ROLs 32 and 34 define a read limit width about track centerline 30. Similarly, the inner Write Off-track Limit (WOL) 36 and outer WOL 38 define a write limit width about track centerline 30. The write limit width is usually narrower than the read limit width because write operations outside the off-track limits can result in unrecoverable or "hard" errors, while read operations outside such limits are "soft" and may be recovered by re-reading the data during the next revolution of the disk 12. Generally, these soft errors merely slow data transfer rates without causing loss of data.

The PES indicates the deviation of the read/write heads 14 from the centerline 30 of the track. If the amplitude difference in information from both sides of the centerline 30 is zero, then it is assumed that the read/write heads 14 are positioned exactly over the centerline 30. A positive amplitude difference in the information indicates that the heads 14 are off center in one direction and a negative amplitude difference in the information indicates that the heads 14 are off center in the opposite direction. Thus, the PES provides an indication of the direction and extent of read/write head 14 movement required to maintain the heads 14 centered about the track.

In one embodiment, the PES provides a threshold measure for inhibiting the read or write function of the read/write heads 14. For example, the write function is inhibited (disabled) when the read/write head 14 position exits the inner or outer WOL 36 or 38. Generally, read/write head 14 position errors greater than the write limit width will force a positive "write inhibit" decision.

A failure mode also occurs when remnant data (or "old data") not overwritten by the most recently written data is read. The data integrity risk of successfully reading remnant data increases as read operations take place further from the centerline 30. This is sometimes referred to as OTR (Old Track Read). To reduce the risk of OTR, the "read inhibit" state is used to temporarily abort read operations when misregistration between the read/write head 14 position and the centerline 30 is detected to be greater than the read limit width specified by the ROLs 32 and 34.

In the read inhibit protection of OTR, the misregistration of the read/write head 14 from the desired centerline 30 could exceed the read limit width specified by the ROLs 32, 34 before the read inhibit was determined (between the current and previous sampled positions) in a sampled-position servo control loop.

The present invention withholds the recovered data from the host 28 until a subsequent sampled servo position is verified from the PES to be within the read limit width. If a read inhibit was posted (i.e., read/write head 14 position greater than read limit width), the data block(s) preceding the servo position that caused the posting of the read inhibit are re-read, once the read inhibit is cleared (e.g., on a next or subsequent revolution of the disk 12). If a read inhibit is not present following the re-read, this re-read data can be released to the host 28.

One possible verification method is to continually re-read the data until matching data is recovered by a predetermined criteria (e.g., two or more consecutive times.). Moreover, misregistration criteria other than that described above could be used to initiate optional OTR verification methods to balance data throughput and reliability.

Moreover, as an option, the risk of OTR can be further reduced by comparing sets of data (e.g., initial read and re-read). If there is a miscomparison of the two sets of data, verifications tests can be performed to determine the correct data set(s), or if a loss of data should be reported to the host 28.

Logic of the Preferred Embodiment

Figure 3:
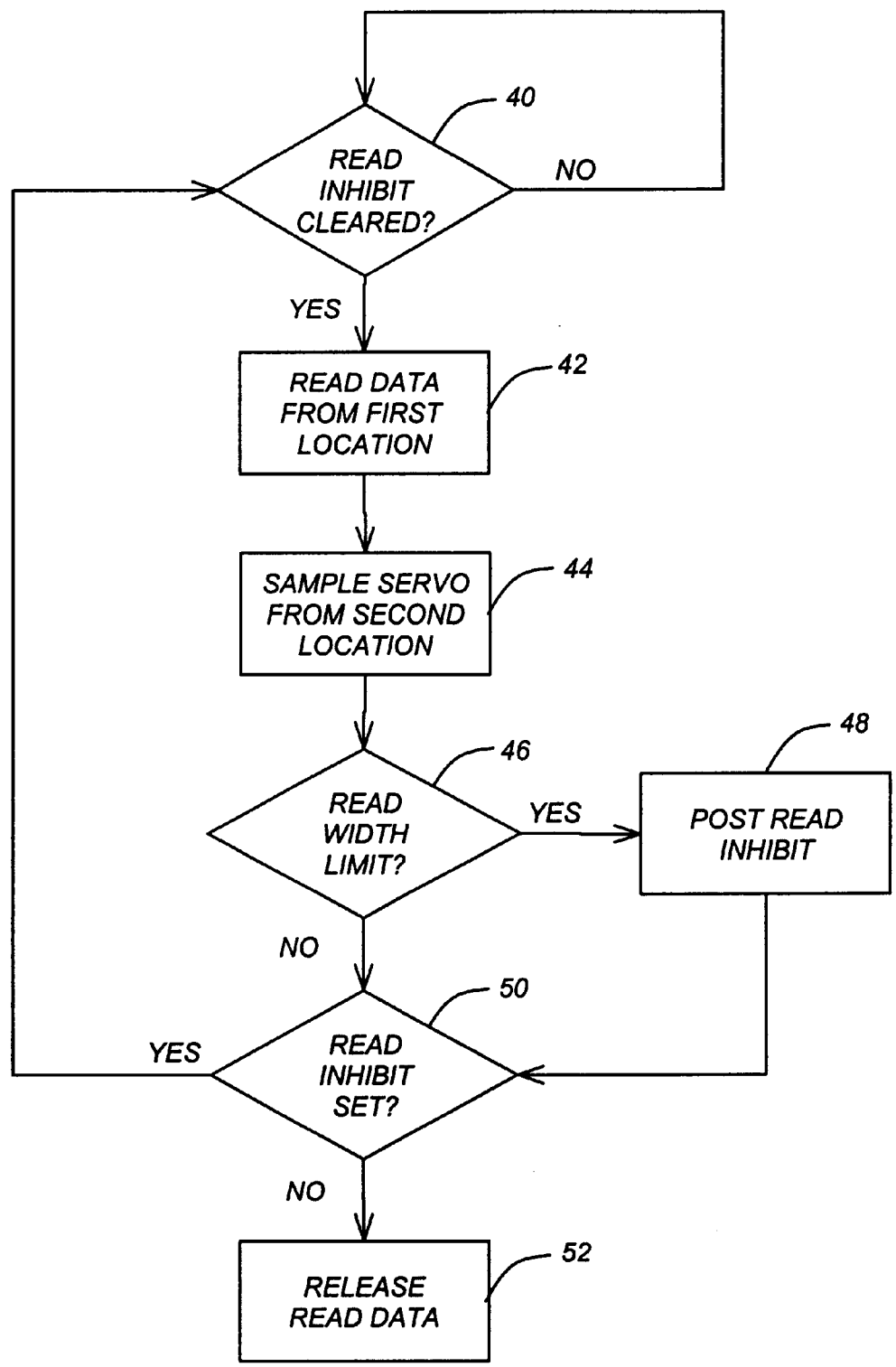
FIG. 3 is a flow chart illustrating the logic performed by the preferred embodiment of the present invention.

FIG. 3 is a flow chart illustrating the logic performed by the preferred embodiment of the present invention. Those skilled in the art will recognize that other logic could be used to accomplish the same results.

Block 40 is a decision block that determines whether a "read inhibit" has been reset or cleared (i.e., the read inhibit state is negative). If so, control transfers to Block 42; otherwise, control loops on Block 40.

Block 42 represents data being read (or re-read) from a first location on a track of the data storage device.

Block 44 represents a servo position being sampled from a second location on the track of the data storage device subsequent to the first location.

Block 46 is a decision block that determines whether the sampled servo position indicates a misregistration from the track of the data storage device, wherein the misregistration indicates the read data is outside a read limit width of the track of the data storage device. If so, control transfers to Block 48; otherwise, control transfers to Block 50.

Block 48 represents the read inhibit being posted, so that the read inhibit is set (i.e., the read inhibit state is positive).

Block 50 is a decision block that determines whether the read inhibit is set. If so, control transfers to Block 40 to repeat the steps of Blocks 40–50; otherwise, control transfers to Block 52. Consequently, the read or re-read data is withheld until it is determined to be within the read limit width of the track of the data storage device.

Block 52 represents the read or re-read data being released when it is determined that the read inhibit is not set.

Note that, in alternative embodiments, Block 50 could transfer control to Block 52 only while the read inhibit is not set and the read data is re-read or recovered according to one or more predetermined criteria. For example, Block 50 could also compare sets of the read data (i.e., sets read on different rotations) and perform verifications tests to determine whether there is correct one of the sets of the read data when the comparing step indicates a miscomparison of the sets of the read data. In another example, Block 50 could also compare sets of the read data and report a loss of data when the comparing step indicates a miscomparison of the sets of the read data.

Conclusion

This concludes the description of the preferred embodiment of the present invention. Generally, the preferred embodiment of the present invention is implemented as logic within the data storage device. This logic comprises instructions and/or data that is embodied in or retrievable from a device, medium, or carrier. Moreover, these instructions and/or data, when read, executed, and/or interpreted by the data storage device, cause the data storage device to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic, instructions, and/or data embodied in or accessible from any device, carrier, or media.

Of course, those skilled in the art will recognize many modifications may be made to this implementation without departing from the scope of the present invention. Indeed, those skilled in the art will recognize that any combination of the above components, or any number of different components, including programmable or non-programmable devices and circuits, may be used to implement the present invention, so long as similar functions are performed thereby.

In addition, the present invention can be applied to any number of different data storage devices. For example, any type of rotating data storage device, such as a magnetic, optical, or other device, could benefit from the present invention. Moreover, different electronics or logic could be used to implement the present invention.

In conclusion, the present invention discloses a data storage device that performs a re-read of data read prior to a read inhibit for data recovery and validation. When misregistration of read/write heads occurs, as indicated by a sampled servo position, data read from a track of the data storage device is withheld from a host until a subsequent sampled servo position is verified to be within a read limit width of the track. Data blocks read preceding the servo position that caused the posting of the read inhibit are re-read, once the read inhibit is cleared. If the read inhibit is not present following the re-read of the data, this re-read data can be released to the host.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing data recovery and validation in a data storage device, comprising:
    (a) reading data from a first location on a track of the data storage device;
    (b) sampling a servo position from a second location on the track of the data storage device subsequent to the first location;
    (c) posting a read inhibit when the sampled servo position indicates a misregistration from the track of the data storage device; and
    (d) repeating steps (a)–(c) until the read inhibit is not posted.

2. The method of claim 1, further comprising releasing the read data when the read inhibit is not posted.

3. The method of claim 1, wherein the misregistration indicates the read data is outside a read limit width of the track of the data storage device.

4. The method of claim 1, wherein the read data is withheld until the read data is determined to be within the read limit width of the track of the data storage device.

5. The method of claim 1, wherein the repeating step (d) further comprises repeating steps (a)–(c) until the read inhibit is not posted and the read data is recovered according to one or more predetermined criteria.

6. The method of claim 1, further comprising comparing sets of the read data and performing verifications tests to determine a correct one of the sets of the read data when the comparing step indicates a miscomparison of the sets of the read data.

7. The method of claim 1, further comprising comparing sets of the read data and reporting a loss of data when the comparing step indicates a miscomparison of the sets of the read data.

8. An apparatus for providing data recovery and validation in a data storage device, comprising:
    a controller for:
    (a) reading data from a first location on a track of the data storage device;
    (b) sampling a servo position from a second location on the track of the data storage device subsequent to the first location;
    (c) posting a read inhibit when the sampled servo position indicates a misregistration from the track of the data storage device; and
    (d) repeating steps (a)–(c) until the read inhibit is not posted.

9. The apparatus of claim 8, wherein the controller releases the read data when the read inhibit is not posted.

10. The apparatus of claim 8, wherein the misregistration indicates the read data is outside a read limit width of the track of the data storage device.

11. The apparatus of claim 8, wherein the read data is withheld until the read data is determined to be within the read limit width of the track of the data storage device.

12. The apparatus of claim 8, wherein the controller repeats (a)–(c) until the read inhibit is not posted and the read data is recovered according to one or more predetermined criteria.

13. The apparatus of claim 8, wherein the controller compares sets of the read data and performs verifications tests to determine a correct one of the sets of the read data when the comparison indicates a niscomparison of the sets of the read data.

14. The apparatus of claim 8, wherein the controller compares sets of the read data and reports a loss of data when the comparison indicates a miscomparison of the sets of the read data.

15. An article of manufacture embodying logic for providing data recovery and validation in a data storage device, the logic comprising:
    (a) reading data from a first location on a track of the data storage device;

(b) sampling a servo position from a second location on the track of the data storage device subsequent to the first location;

(c) posting a read inhibit when the sampled servo position indicates a misregistration from the track of the data storage device; and (d) repeating steps (a)–(c) until the read inhibit is not posted.

16. The article of manufacture of claim 15, further comprising releasing the read data when the read inhibit is not posted.

17. The article of manufacture of claim 15, wherein the misregistration indicates the read data is outside a read limit width of the track of the data storage device.

18. The article of manufacture of claim 15, wherein the read data is withheld until the read data is determined to be within the read limit width of the track of the data storage device.

19. The article of manufacture of claim 15, wherein the repeating step (d) further comprises repeating steps (a)–(c) until the read inhibit is not posted and the read data is recovered according to one or more predetermined criteria.

20. The article of manufacture of claim 15, further comprising comparing sets of the read data and performing verifications tests to determine a correct one of the sets of the read data when the comparing step indicates a miscomparison of the sets of the read data.

21. The article of manufacture of claim 15, further comprising comparing sets of the read data and reporting a loss of data when the comparing step indicates a miscomparison of the sets of the read data.

* * * * *